United States Patent [19]
Whaley et al.

[11] Patent Number: 6,093,439
[45] Date of Patent: *Jul. 25, 2000

[54] HYDROCOLLOID COMPOSITION FOR USE AS A GELLING AGENT VISCOSIFIER AND STABILIZER

[75] Inventors: Judith K. Whaley, Belle Mead; James J. Kasica, Whitehouse Station; Jamie L. Senkeleski, Neshanic Station, all of N.J.; Jeffrey W. Foss, Easton, Pa.; John R. Heigis, Somerville, N.J.

[73] Assignee: National Starch and Chemical Investment Holding Corporation, Wilington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/074,791

[22] Filed: May 8, 1998

[51] Int. Cl.[7] .................................................. A23L 1/05
[52] U.S. Cl. ........................ 426/573; 426/549; 426/578; 426/661
[58] Field of Search ................... 426/573, 661, 426/578, 549

[56] References Cited

U.S. PATENT DOCUMENTS

| | | | |
|---|---|---|---|
| 3,969,534 | 7/1976 | Pavey et al. | 426/34 |
| 4,169,854 | 10/1979 | Igoe | 426/583 |
| 4,374,217 | 2/1983 | Miyake et al. | 524/47 |
| 4,608,265 | 8/1986 | Zwiercan et al. | 426/582 |
| 4,695,475 | 9/1987 | Zwiercan et al. | 426/582 |
| 4,971,723 | 11/1990 | Chiu | 252/315.3 |
| 4,981,709 | 1/1991 | Furcsik et al. | 426/565 |
| 5,094,872 | 3/1992 | Furcsik et al. | 426/578 |
| 5,131,953 | 7/1992 | Kasica et al. | 127/65 |
| 5,188,674 | 2/1993 | Kasica et al. | 127/66 |
| 5,281,432 | 1/1994 | Zallie et al. | 426/549 |
| 5,308,636 | 5/1994 | Tye et al. | 426/573 |
| 5,318,635 | 6/1994 | Kasica et al. | 127/69 |
| 5,435,851 | 7/1995 | Kasica et al. | 127/69 |
| 5,470,391 | 11/1995 | Mallee et al. | 127/38 |
| 5,547,513 | 8/1996 | Mallee et al. | 127/38 |
| 5,571,552 | 11/1996 | Kasica et al. | 426/573 |
| 5,584,937 | 12/1996 | Finocchiaro et al. | 127/38 |
| 5,614,243 | 3/1997 | Dunn et al. | 426/578 |
| 5,807,601 | 9/1998 | Carpenter et al. | 426/578 |

FOREIGN PATENT DOCUMENTS

| | | | |
|---|---|---|---|
| 0 363 741 A2 | 4/1990 | European Pat. Off. | A23C 20/00 |
| 1316474 | 11/1969 | United Kingdom | C08B 25/02 |

OTHER PUBLICATIONS

Bassett, Harold J., "Use of Stabilizers in Cultured Dairy Foods", ACDPI Annual Conference, Mar. 1982.

"Speciality Starches in Yogurt Formulations", Dairy Industries International, Aug. 1994.

Doreau, Albert, Food Ingredients Europe 1993 Conference.

Winterton, D. et al., "A Modified Starch Stabiliser for Low–Cost production of Fruit Yoghurt", Australian J. of Dairy Technology, Jun. 1978, pp. 55–56.

"Gums, Starches and EPS", Dairy Foods, pp. 47–49, Jul. 1992.

*Primary Examiner*—Chhaya D. Sayala
*Attorney, Agent, or Firm*—Karen G. Kaiser

[57] ABSTRACT

The present invention is directed to the use of a hydrocolloid composition, particularly a starch composition, which is useful as a viscosifier and/or a stabilizer in food products, particularly cultured dairy products, to products containing such hydrocolloid composition, and to the method of preparing such products. The present invention is also directed to the replacement of at least a portion of the gelatin, gum, and/or non-fat milk solids present in food products with such composition without losing the organoleptic and structural properties of the product.

18 Claims, No Drawings

HYDROCOLLOID COMPOSITION FOR USE AS A GELLING AGENT VISCOSIFIER AND STABILIZER

The present invention pertains to the use of a hydrocolloid composition, particularly a starch composition, which is useful as a gelling agent, viscosifier and/or a stabilizer in food products, particularly in cultured dairy products.

BACKGROUND OF THE INVENTION

Gelatin, non-fat milk solids, gums, and other stabilizers/viscosifiers are commonly present in the formulation of many food products, including dairy compositions, for a variety of functional roles. Removal or reduction of these components negatively impacts various organoleptic and structural properties of the final product, such as viscosity, stability, and mouthfeel.

Gelatin replacement is desirable in order to meet Kosher and Halal food standards. Consumers may also desire products which do not contain gelatin for a variety of other reasons including because they are strict vegetarians or want to avoid bovine products because of the current scare over Bovine Spongiform Encephalopathy (Mad Cow Disease).

Further, gelatin, non-fat milk solids, and gums are expensive ingredients, especially relative to starch. Replacement of gelatin and/or non-fat milk solids is therefore desirable to reduce the cost of the dairy product.

However, consumers demand that food products in which at least a portion of the gelatin or non-fat milk solids has been removed retain the quality of the corresponding conventional products.

Other hydrocolloids and starches have been used to add texture and stability to food products, particularly to replace fat. For example, U.S. Pat. Nos. 5,470,391; 5,547,513; 5,584,937; and 5,614,243 disclose jet cooked, high amylose starch products which are texturizers in that they provide fat-like attributes to reduced or no fat products. U.S. Pat. Nos. 5,094,872 and 4,981,709 also describe methods of preparing reduced fat food products by replacing a portion of the fat with a high amylose starch. However, none provide the unique organoleptic and structural properties of the present composition.

Further, there are a number of starch/hydrocolloid blends which are known in the art to add gelling, viscosity and stability to food products, including U.S. Pat. No. 5,308,606; and U.S. Pat. No. 4,169,854. However, none of these blends have used the starch to provide the necessary gelling characteristics of the food product as it has previously been found that starch does not provide the same gelling characteristics that may be obtained using non-starch hydrocolloids such as gelatin.

Surprisingly, it has now been discovered that a hydrocolloid composition, particularly a starch composition, containing a high amylose gelling starch fraction and, a non-gelling viscosifying hydrocolloid that provides viscosity after shear and/or a non-gelling stabilizing hydrocolloid which may be used to gel stabilize and viscosify food products, particularly dairy products, more particularly cultured dairy products, can provide excellent organoleptic and structural properties. Further, such hydrocolloid compositions may be used to replace gelatin, gums, and/or non-fat milk solids in food products, while maintaining the organoleptic and structural properties of the products.

SUMMARY OF THE INVENTION

The present invention is directed to the use of a hydrocolloid composition, particularly a starch composition, which is useful as a gelling agent viscosifier, and/or a stabilizer in food products, particularly cultured dairy products, to products containing such hydrocolloid composition, and to the method of preparing such products. The present invention is also directed to the replacement of at least a portion of the gelatin, gum, and/or non-fat milk solids present in food products with such composition without losing the organoleptic and structural properties of the product.

The hydrocolloid composition is composed of at least two components. The first component is a high amylose gelling starch fraction and comprises from about 20% to about 80% of the starch composition by weight.

The second component is a non-gelling viscosifying hydrocolloid that provides viscosity after shear and comprises from about 0% to about 80% of the starch composition by weight, or is a non-gelling stabilizing hydrocolloid and comprises from about 0 to about 80% by the starch composition by weight.

In an alternative embodiment, all three components are present.

This composition is useful as a gelling agent, viscosifier, and/or a stabilizer in a variety of food products, particularly cultured dairy products.

An object of the present invention is to provide a hydrocolloid composition which can be used as a gelling agent, viscosifier and/or stabilizer in a food product, particularly a cultured dairy product.

Another object of the present invention is to provide a hydrocolloid composition which can be used as a gelling agent, viscosifier and/or stabilizer in a cultured dairy product which can replace at least part of the gelatin and/or non-fat milk solids without significantly changing the organoleptic or structural properties of the dairy product.

Yet another object of the present invention is to provide a hydrocolloid composition which can be used to replace at least a portion of the gelatin, gum, or non-fat milk solids without losing any of the organoleptic or structural properties.

A further object of the present invention is to provide a starch composition which can be used as a gelling agent, viscosifier and/or stabilizer in a cultured dairy product which can replace at least part of the gelatin and/or non-fat milk solids without significantly changing the organoleptic or structural properties of the dairy product.

A still further object of the present invention is to provide a starch composition which can be used to replace at least a portion of the gelatin, gum, or non-fat milk solids without losing any of the organoleptic or structural properties.

These and other objects of the present invention will become apparent to one skilled in the art from the following detailed description and examples below.

DETAILED DESCRIPTION OF THE INVENTION

The present invention is directed to the use of a hydrocolloid composition, particularly a starch composition, which is useful as a gelling agent, viscosifier and/or a stabilizer in food products, particularly cultured dairy products, to products containing such hydrocolloid composition, and to the method of preparing such products. The present invention is also directed to the replacement of at least a portion of the gelatin, gum, and/or non-fat milk solids present in food products with such composition without losing the organoleptic and structural properties of the product.

The hydrocolloid may be any starch, gum or protein which meet the criteria listed below for each component.

All gums may be suitable for use herein and may be derived from any native source, including gellan, pectin, furcelleran, carrageenan, alginates, agar, tamarind seed gum, xanthan gum, konjac gum, guar gum, gum arabic, and locust bean (or carob seed) gum.

All starches and flours (hereinafter "starch") may be suitable for use herein and may be derived from any native source. A native starch or flour as used herein, is one as it is found in nature. Also suitable are starches and flours derived from a plant obtained by standard breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable herein.

Typical sources for the starches and flours are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. As used herein, the term "waxy" is intended to include a starch or flour containing at least about 95% by weight amylopectin and the term "high amylose" is intended to include a starch or flour containing at least about 40% by weight amylose.

Conversion products derived from any of the starches, including fluidity or thin-boiling starches prepared by oxidation, enzyme conversion, acid hydrolysis, heat and or acid dextrinization, thermal and or sheared products may also be useful herein.

The suitable starches may be chemically or physically modified. Suitable derivatives include esters, such as the acetate, and half esters, such as the succinate and octenyl succinate, prepared by reaction with acetic anhydride, succinic anhydride, and octenyl succinic anhydride, respectively; phosphate derivatives prepared by reaction with sodium or potassium orthophosphate or sodium or potassium tripolyphosphate; ethers such as hydroyxpropyl ether, prepared by reaction with propylene oxide; or any other edible starch derivatives or combinations thereof approved for use in food products.

Modification by crosslinking may also provide starches having properties that are useful. Crosslinking agents suitable for food starches include phosphorus oxychloride, epichlorohydrin, sodium trimetaphosphate and adipicacetic mixed acid anhydrides. Procedures for modifying starches are described in the Chapter "Starch and Its Modification" by M. W. Rutenberg, pages 22–26 to 22–47, Handbook of Water Soluble Gums and Resins, R. L. Davidson, Editor (Mc Grawhill, Inc., New York, N.Y. 1980).

Physically modified starches, such as thermally-inhibited starches described in the family of patents represented by WO 95/04082, may also be suitable for use herein.

Any starch or starch blends having suitable properties for use in food products herein may be purified by any method known in the art to remove starch off flavors and colors that are native to the starch or created during starch modification processes. Suitable purification processes for treating the instant starches are disclosed in the family of patents represented by EP 554 818 (Kasica, et al.). Alkali washing techniques, for starches intended for use in either granular or pregelatinized form, are also useful and described in the family of patents represented by U.S. Pat. No. 4,477,480 (Seidel) and U.S. Pat. No. 5,187,272 (Bertalan et al.).

The hydrocolloid composition is composed of at least two components. The first component is a high amylose gelling starch fraction and comprises from about 20% to about 80% of the composition by weight. Gelling fraction, as used herein, is intended to mean a process in which the polymer chains aggregate in solution to create a network structure. This gelling process is characterized by measuring tan $\delta$, tan $\delta$ being the ratio of the loss modulus $G''$ to storage modulus $G'$. These and other Theological terms such as critical strain are known in the art and disclosed for example in *Viscoelastic Properties of Polymers*, Ferry, John Wiley & Sons: New York (1980). For a solution, tan $\delta$ is initially greater than one when measured at one radian/second at the temperature of interest and then undergoes a transition to become less than one as the material gels. In particular, the gelling fraction is a high amylose, solubilized starch.

Although the gelling starch may be any starch which meets the above description, substantially non-crystalline, substantially non-retrograded high amylose starches are particularly suitable. Such starches may be prepared by jet-cooking, then sprayed drying without allowing the solution/dispersion to cool between processing steps as described, for example, in the family represented by U.S. Pat. No. 5,131,953. Jet cooking, as used herein, refers to the process of slurrying the starch and then heating the slurry to a temperature of from about 120° C. to about 170° C., in order to gelatinize substantially all of the starch. The jet cooking is generally carried out on a slurry at a solids level of from about 10 to about 40%, particularly about 20 to about 25% and a pH of about 4 to about 7 with a pressure greater than 60 psi in the cooking chamber.

More particularly, the substantially non-crystalline, substantially non-retrograded high amylose starches are at least partially converted (hydrolyzed) to a calcium chloride viscosity of from about 15 to 75, particularly from about 20 to 50.

The calcium chloride viscosity of the high amylose starch is measured using a Thomas Rotation Shear-Type Viscometer standardized at 30° C. (86° F.) with a standard oil having a viscosity of 24.73 cps., which oil requires 23.12±0.05 seconds for 100 revolutions. As the conversion of the starch increases, the viscosity of the starch decreases and the calcium chloride viscosity decreases. Accurate and reproducible measurements of the calcium chloride viscosity are obtained by determining the time which elapses for 100 revolutions at a specific solids level.

A total of 7.2 g of the converted starch (anhydrous basis) is slurried in 100 grams of buffered 20% calcium chloride solution in a covered semi-micro stainless steel cup (250 ml capacity available from Eberbach), and the slurry is transferred to a glass beaker and is heated in a boiling water bath for 30 minutes with occasional stirring. The starch solution is then brought to the final weight (107.2 g.) with hot (approximately 90°–100° C., 194°–212° F.) distilled water. The time required for 100 revolutions of the resultant solution at 81°–83° C. (178°–181° F.) is measured three times in rapid succession and the average of the three measurements is recorded.

The calcium chloride solution is prepared by dissolving 264.8 g. of reagent grade calcium chloride dihydrate in 650 ml. Of distilled water in a tared 1 liter glass beaker. Thereafter 7.2 g of anhydrous sodium acetate is dissolved in the solution. The solution is allowed to cool and the pH is measured. If necessary, the solution is adjusted with hydrochloric acid to pH 5.6±0.1. The solution is then brought to weight (1007.2 g) with distilled water.

Methods of conversion are well known in the art and include oxidation, enzyme conversion, acid hydrolysis, heat and/or acid dextrinization. Particularly suitable methods are acid and enzyme hydrolysis as these methods do not impair the gelling strength of the starch.

In the alternative, the starch may be jet cooked to thoroughly disperse the starch and directly incorporated into the food product such that it does not substantially retrograde or crystallize, for example by incorporation into hot milk and then pasteurizing.

Also suitable are at least partially non-crystalline, at least partially non-retrograded, high amylose starches such as those disclosed in U.S. Pat. Nos. 5,547,513 and 5,584,937.

The second component is a non-gelling, viscosifying fraction and comprises a food hydrocolloid that provides viscosity after shear. The viscosifying fraction comprises from about 0 to 80%, particularly from about 20% to about 80% of the composition by weight.

In general, the viscosifying fraction of the composition should not exceed 1.5% of the food product by weight. If more of the viscosifying fraction is used, the dairy product will tend to have an undesirable cohesive or pasty mouthfeel.

Although the viscosifying fraction may be any starch which meets the above description, crosslinked or stabilized and crosslinked starches are particularly suitable, more particularly those derived from a waxy base starch. Methods of crosslinking and stabilizing starches are well known in the art and are taught, for example, in Starch Chemistry and Technology, 2nd ed., Edited by Whistler, et al., Academic Press, Inc., Orlando (1984) or Modified Starches: Properties and Uses, Wurzburg, O. B., CRC Press, Inc., Florida, (1986).

Crosslinking agents suitable for the present invention include, but are not limited to adipic/acetic mixed anhydride, epichlorohydrin, sodium trimetaphosphate, sodium trimetaphosphate/sodium tripolyphosphate, acrolein, and phosphorous oxychloride. The amount of crosslinking agent used is also known in the art. In general, epichlorohydrin or phosphorous oxychloride is added in an amount of from about 0.001 to about 1%, particularly from about 0.01 to about 0.15%, more particularly from about 0.01 to about 0.05% by weight of the starch; adipic/acetic mixed anhydride, sodium trimetaphosphate, or sodium trimetaphosphate/sodium tripolyphosphate is added in an amount of from about 0.1 to about 10%, particularly from about 0.1 to about 1.5%, more particularly from about 0.1 to about 0.5% by weight of the starch; and acrolein is added in an amount of from about 0.001 to about 0.6%, particularly from about 0.1 to about 0.4%, by weight of the starch. Stabilizing agents include, but are not limited to alkylene oxides such as ethylene oxide, propylene oxide, and butylene oxide, and acetic anhydride and vinyl acetate, and are added in an amount of from about 1 % to about 25%, particularly from about 1 to about 20%, most particularly from about 1 to about 15%, by weight of the starch.

Starches which have been thermally inhibited are also particularly suitable as the non-gelling viscosifying fraction. Thermally inhibited starches are well known in the art and have been disclosed for example in the patent family represented by European Patent Application Publication No. 721 471. These starches may be further chemically crosslinked and/or stabilized as described above.

The third component is a non-gelling hydrocolloid of lower viscosity and gel strength than the viscosifying component. It is a stabilizing component and comprises from about 0 to 80%, particularly from about 20 to about 50% of the starch composition by weight. The stabilizer is added to improve the water holding capacity of the composition without adding a pasty or overly viscous mouthfeel to the food product while preserving a desirable elastic texture. The addition of this component to the composition contributes to proper breakdown of the food product in the consumer's mouth.

Particularly suitable stabilizers include partially stabilized starches which contribute to elasticity with minimal gelling. Methods of stabilizing starches are well known in the art and are taught, for example, in Starch Chemistry and Technology, 2nd ed., Edited by Whistler, et al., Academic Press, Inc., Orlando (1984) or Modified Starches: Properties and Uses, Wurzburg, O. B., CRC Press, Inc., Florida, (1986). Stabilizing agents include, but are not limited to alkylene oxides such as ethylene oxide, propylene oxide, and butylene oxide, alkenyl succinic anhydrides such as octenyl succinic anhydride, and acetic anhydride, and are added in an amount of from about 1% to about 25%, particularly from about 1 to about 15%, most particularly from about 1 to about 10%, by weight of the starch.

The stabilized starches are particularly at least partially converted to a water fluidity of up to about 90, more particularly to a water fluidity of up to about 45. Water fluidity is an empirical measure of viscosity on a scale of 0–90, wherein fluidity is the reciprocal of viscosity. Water fluidity of starches is typically measured using a Thomas Rotational Shear-type Viscometer (commercially available from Arthur A. Thomas Co., Philadelphia, Pa.), standardized at 30° C. with a standard oil having a viscosity of 24.73 cps, which oil requires 23.12±0.05 sec for 100 revolutions. Accurate and reproducible measurements of water fluidity are obtained by determining the time which elapses for 100 revolutions at different solids levels depending on the starch's degree of conversion: as conversion increases, the viscosity decreases. The conversion may be by any method known in the art including oxidation, enzyme conversion, acid hydrolysis, heat and/or acid dextrinization.

Certain starches or hydrocolloids suitable for the non-gelling components may gel: the essential criterion is that there is a non-gelling fraction in the component. For example, a partially hydrolyzed dent corn is suitable for the third component. While dent corn technically gels, there is a significant fraction of amylopectin which is non-gelling and contributes functionally to the composition.

Certain hydrocolloids or starches may contain two or more fractions such that they meet the criteria for more than one of the above components. In such cases, the hydrocolloid may be used as more than one fraction. For example, debranched potato starch contains both a high and low molecular weight, high amylose fraction and a partially to fully debranched amylopectin fraction. Thus, it may be used both to meet the criteria of a high amylose gelling starch and a non-gelling, stabilizing hydrocolloid.

Other characteristics of the three components may be desired and can be chosen by one skilled in the art. For example, a dent corn base may be desirable for the third component of the composition for use when higher gel strength is required while a waxy corn base may preferred when more stability is desired.

The hydrocolloid blend is typically both water hydratable and dispersible. The hydrocolloids may be pre-hydrated prior to being mixed into the present composition, or may be hydratable when added to the food product.

Any of the components may further be treated using techniques known in the art to render them pregelatinized.

Such techniques include drum drying and spray drying, including spray drying using the methods described in the families represented by U.S. Pat. Nos. 4,280,851; 4,600,480; 5,131,953; and 5,149,799, and alcohol treatments as described in U.S. Pat. No. 4,465,702.

Hydrocolloids previously used in the food industry failed to provide high gel strength, high deformability and high water retention simultaneously. The instant hydrocolloid blends provide these properties as indicated by a G' greater than about 1000 Pa., a critical strain greater than about 20% and water loss <1.5% when subjected to large loads. Thus, the hydrocolloid blend provides cuttability in the yogurt and structural stability without syneresis or wheying off.

The ratio of the three components may be chosen so as to achieve the desired characteristics for the selected food product. Particularly suitable is that the components are present in approximately equal amounts.

The composition may be used to replace at least part of the gelatin, gum, and/or non-fat milk solids in any food product known in the art, particularly any dairy product including, but not limited to, yogurts, sour creams, mousses, puddings, sauces, frozen desserts, cheeses or cheese products, and dressings. Of particular importance are cultured dairy products such as yogurt, sour cream, and cream cheese. The composition may also be used to improve gelling, stability and viscosity to the food product, resulting in a more organoleptically desirable product.

The starch composition may be added in an amount necessary to maintain the organoleptic and structural properties of the dairy product. The starch composition is generally added in an amount of from about 0.1 to 7.5%, particularly from about 1.0 to 4.5%, depending upon the amount of gelatin and/or non-fat milk solids removed.

The present starch composition is useful as a gelling agent, viscosifier and/or as a stabilizer. As a gelling agent, the product has good set, cuttability, and meltaway.

As a viscosifier, the instant starch adds viscosity to the dairy product, providing mouthfeel and body. An advantage of the present starch compositions is that they do so without adding the gumminess and/or pastiness many starches and gelatin/non-fat milk solids replacers may add to the dairy product. In addition the starch maintains a substantial portion of the viscosity upon stirring such that the body of the dairy product does not significantly change.

As a stabilizer, the starch prevents the viscosity of the dairy product from significantly changing over time.

Further, the present starch compositions minimize syneresis and wheying of the dairy product. Syneresis, as used herein, is defined as the separation of at least some of the whey or other liquid from the rest of the dairy product. Syneresis is a common problem with many dairy products, particularly yogurt and sour cream, and is found to be undesirable to consumers.

The present starch composition is useful as a gelling agent, viscosifier, and stabilizer in both American-style and European-style yogurts. In general, American-style yogurts are thick and spoonable and European-style yogurts are thin and pourable.

Other embodiments include:

1. A dairy composition comprising a hydrocolloid blend comprising:
   (a) a high amylose gelling starch;
   (b) a non-gelling viscosifying hydrocolloid that provides viscosity after shear; and
   (c) a non-gelling, stabilizing hydrocolloid.

2. The composition of 1, wherein component (b) is a non-gelling viscosifying starch that provides viscosity after shear; and component (c) is a non-gelling, stabilizing starch.

3. The composition of 1, wherein component (a) is substantially non-retrograded, non-crystalline; component (b) is a crosslinked starch; and component (c) is a stabilized starch.

4. The composition of 3, wherein components (a) and (c) are further at least partially converted and component (b) is further stabilized starch.

5. The composition of 1, wherein component (a) is at least partially non-retrograded and at least partially non-crystalline.

6. The composition of 1, wherein component (a) is a substantially non-retrograded, substantially non-crystalline partially converted high amylose starch, component (b) is a crosslinked, stabilized, waxy starch, and component (c) is a partially converted stabilized starch.

7. The composition of 1, wherein component (a) is present in an amount of from about 20–80%, component (b) is present in an amount of from about 0–80%, component (c) is present in an amount of from about 0–80%, and wherein either component (b) or (c) must be present in an amount of at least about 20%.

8. The composition of 7, wherein component (c) is present in an amount of from about 20–80%.

9. The composition of 1, wherein the hydrocolloid blend is present in an amount of from about 0.1 to 7.5% of the composition.

10. The composition of 6, wherein the hydrocolloid blend is present in an amount of from about 0.1 to 7.5%.

11. The composition of 9, wherein the hydrocolloid blend is present in an amount of from about 1.0 to 4.5%.

12. The composition of 10, wherein the hydrocolloid blend is present in an amount of from about 1.0 to 4.5%.

13. A method of replacing at least a portion of the gelatin, gum, and/or non-fat milk solids in a dairy product comprising adding a hydrocolloid blend comprising:
   (a) a high amylose gelling starch;
   (b) a non-gelling viscosifying hydrocolloid that provides viscosity after shear; and
   (c) a non-gelling, stabilizing hydrocolloid.

14. The method of 13, wherein component (a) is a substantially non-retrograded, substantially non-crystalline partially converted high amylose starch, component (b) is a crosslinked, stabilized, waxy starch, and component (c) is a partially converted stabilized starch.

15. A method of gelling, viscosifying and/or stabilizing a dairy product comprising adding hydrocolloid blend comprising:
   (a) a high amylose gelling starch;
   (b) a non-gelling viscosifying hydrocolloid that provides viscosity after shear; and
   (c) a non-gelling, stabilizing hydrocolloid.

16. The method of 15, wherein component (a) is a substantially non-retrograded, substantially non-crystalline partially converted high amylose starch, component (b) is a crosslinked, stabilized, waxy starch, and component (c) is a partially converted stabilized starch.

17. The composition of 1, wherein the hydrocolloid blend at 10% solids has a modulus greater than about 1000 Pascals, a critical strain greater than about 20%, and which exhibits water loss <1.5% when subjected to a relative centrifugal force (RCF) of 10,000 g.

18. The composition of 6, wherein the hydrocolloid blend at 10% solids has a modulus greater than about 1000

Pascals, a critical strain greater than about 20%, and which exhibits water loss <1.5% when subjected to a relative centrifugal force (RCF) of 10,000 g.

The following examples are presented to further illustrate and explain the present invention and should not be taken as limiting in any regard.

EXAMPLES

The following starches were used in the examples.

Starch A—A slurry of a 70% high amylose starch was treated with 2.5% hydrochloric acid at 52° C. for 16 hours to a calcium chloride viscosity of about 25 seconds. After neutralization with sodium carbonate to a pH of about 6, the converted starch was filtered, washed and dried. The starch was jet cooked at 21% solids, 143° C., 27 g/min steam flow, and 39.7 ml/min cooking rate. The jet cooked dispersion was spray dried with an inlet temperature of 250° C. and an outlet temperature of 88° C.

Starch B—A slurry of waxy corn starch was prepared and about 25 sodium sulfate based on the weight of the starch was added. The pH was adjusted to about 12 using a 3% sodium hydroxide solution. 8.5% propylene oxide based upon the weight of the starch was added and the reaction was allowed to proceed for 18 hours at a temperature of about 45° C. The slurry was cooled to about 30° C. and 0.017% phosphorus oxychloride was added. The reaction was allowed to proceed for about 30 minutes. The pH was adjusted to about 3 using sulfuric acid and held for one hour. The slurry was neutralized to a pH of about 6 using a 3% sodium hydroxide solution.

Starch C—A slurry of corn starch was prepared and treated with hydrochloric acid to achieve a water fluidity of 50. The converted starch was then acetylated to achieve a bound acetyl level of 1.0%.

Starch D—The procedure of making Starch C was repeated to achieve a water fluidity of 35 and a bound acetyl level of 0.9%.

Starch E—The procedure of making Starch C was repeated to achieve a water fluidity of 30 and a bound acetyl level of 1.0%.

Starch F—The procedure of making Starch C was repeated using a waxy corn starch in place of a dent corn starch.

Starch G—The procedure of making Starch C was repeated to achieve a water fluidity of 35.

Starch H—A slurry of corn starch was prepared and treated with hydrochloric acid to achieve a water fluidity of 65.

Starch I—The procedure of making Starch B was repeated using 5.0% propylene oxide and 0.013% phosphorus oxychloride.

Example 1

Properties of Starches

A. Storage Modulus (G')

To test the storage modulus of the starch at 10% solids the samples were dispersed in water and cooked for 30 minutes on a boiling water bath. The starch was then pipetted onto parallel plate geometry at 10° C. on an RFSII rheometer commercially available from Rheometrics Scientific. The modulus was monitored at low strain at one radian/second (in the Linear Viscoelastic Region) until an equilibrium value was reached. The equilibrium value was taken as the point at which there was less than a 5% change in modulus over a 300 second period or at 7500 seconds.

B. Critical Strain

To measure the critical strain (deformability) of the gel formed by the starch at 10% solids, an oscillatory shear strain sweep was run whereby incrementally larger deformations were applied to the gel. The critical strain value was defined as the strain at which the G' changed by more than 20% of the G' value in the linear viscoelastic region. This measurement was performed on samples after they gelled on the rheometer described in A.

C. Water Loss

To test the ability of the starch to retain its water content under force, cooked and gelled starch samples were centrifuged at 10K RPM for 10 minutes at room temperature using a Marothon 21K/R centrifuge commercially available from Fisher Scientific. 30 g of sample were poured into a 40 ml plastic centrifuge tube and allowed to gel overnight before testing. Any supernatant formed during the centrifugation was poured out into a tared vial to determine the weight of water lost. The water loss is reported as grams supernatant/total water=% gram/gram.

A variety of starches and starch blends were characterized using the above methodology. The results are listed below.

| Example | Starch(es) Used | Ratio (w:w) | G' | Critical Strain | Water holding | Comments |
|---|---|---|---|---|---|---|
| 1a | Starch B | — | 1.97 E03 | 5.5 | 0 | Non-gelling |
| 1b | Starch A | — | 2.36 E04 | <0.5 | 5 | Brittle, loses water |
| 1c | Starch A Starch B | 0.75:1.0 | 5.04 E03 | 49 | .2 | Meets all criteria |
| 1d | Starch A Starch B | 1.0:1.0 | 4.00 E03 | 44 | .5 | Meets all criteria |
| 1e | Starch A Starch B | 0.75:1.25 | 4.47 E03 | 43 | .2 | Meets all criteria |
| 1f | Starch A Starch B Starch C | 1.0:1.25:1.0 | 5.56 E03 | 46 | 0 | Meets all criteria |
| 1g | Starch A Starch B Starch F | 1.0:1.25:1.0 | 1.06 E03 | 26 | 1 | Meets all criteria |
| 1h | Optigrade 301[1] | — | 1.27 E05 | 1.25 | 5 | Brittle, loses water |
| 1i | Starch H | | 4.94 E02 | 25.5 | 2.5 | Weak gel, loses water |

[1]commercially available from Opta Food Ingredients

The hydrocolloid blends of the present application, 1c–1g, provide high G', high critical strain and high water retention simultaneously as indicated by a G' greater than about 1000 Pa., a critical strain greater than about 20% and zero water loss when subjected to large loads. In contrast, the hydrocolloids which fail these criteria fall outside of the present application and tend to exhibit weak gelling, brittleness, and/or water loss.

Example 2

Preparation of Swiss Style Low Fat Yogurt

| | AMOUNT (% w/w) | |
|---|---|---|
| A. INGREDIENTS | Experimental | Control |
| Skim Milk | 85.65 | 85.60 |
| Heavy Cream | 4.00 | 4.00 |
| Sugar | 5.00 | 5.00 |
| Whey Protein Concentrate (34% protein) | 1.00 | 1.00 |
| Non-Fat Dry Milk | 0.80 | 2.80 |
| Starch A | 1.00 | 0.00 |

-continued

| A. INGREDIENTS | AMOUNT (% w/w) | |
|---|---|---|
| | Experimental | Control |
| Starch B | 1.25 | 1.00 |
| Starch C | 1.00 | 0.00 |
| Gelatin (225 Bloom) | 0.00 | 0.30 |
| Culture (YC-470)* | 0.30 | 0.30 |

*commercially available from Chr. Hansen, Inc.

The sugar, nonfat dry milk, and starch were blended thoroughly. The dry blend was added to the skim and cream under high agitation. The mix was preheated to 150° F. and homogenized at 500 psi, first stage only. The mix was then pasteurized at 200° F. for 30 seconds and cooled to 112–114° F. The mixture was inoculated with 0.30% yogurt culture and incubated at 114° F. until a pH range of 4.5–4.6 was obtained. The product was screened, then pumped with desired fruit/flavor prep into cups and refrigerated.

The yogurts were evaluated after three days. The experimental yogurt made with the three component starch blend (made without gelatin) resulted in a texture that was equal to and even superior to the texture of the control yogurt (gelatin-based). Both products had a shiny surface appearance and an identical smoothness. The starch-based yogurt had a superior cuttability (sharpness of divot when the product is cut into with a spoon) and slightly heavier stir down viscosity when compared to the gelatin-based yogurt. Each yogurt had a short texture with medium body as well as a smooth, slippery mouth feel. The yogurts were also comparable in mouth coating.

B. Additional yogurts were made using the formulation and procedure of Example 2A. In each the case, the experimental formulation was determined by removing Starch B, gelatin, and 2% non-fat dry milk. The experimental starch(es) was (were) added at the levels indicated in the table below and the skim milk content was adjusted to bring the formulation up to 100%.

After three days, the yogurts were evaluated on a scale of 1 to 5 (1 being excellent and 5 being poor) for texture, stability over time, and water holding ability. The average results are listed below.

| Example | Starch(es) Used | Amount (% w/w) | Texture | Stability | Water holding |
|---|---|---|---|---|---|
| 2a | Starch B | 0.5 | 5.0 | 1 | — |
| 2b | Starch B | 1.5 | 4.0 | 1 | — |
| 2c | Starch B | 2.0 | 5.0 | 1 | — |
| 2d | Starch A | 0.5 | 5.0 | 1 | — |
| 2e | Starch A | 1.5 | 4.0 | 1 | — |
| 2f | Starch A | 2.5 | 5.0 | 1 | — |
| 2g | Starch A | 0.75 | 4.5 | 1 | — |
| | Starch B | 1.0 | | | |
| 2h | Starch A | 1.0 | 4.0 | 1 | — |
| | Starch B | 1.0 | | | |
| 2i | Starch A | 0.75 | 3.0 | 1 | 2 |
| | Starch B | 1.25 | | | |
| 2j | Starch A | 1.0 | 1.0 | 2 | 2 |
| | Starch B | 1.25 | | | |
| | Starch C | 1.0 | | | |
| 2k | Starch A | 1.0 | 2.0 | 1 | 1 |
| | Starch B | 1.25 | | | |
| | Starch F | 1.0 | | | |
| 2l | Optigrade 301[1] | 1.5 | 5.0 | 1 | — |

[1]commercially available from Opta Food Ingredients

After three days, the yogurts were evaluated for texture, stability, and waterholding properties. Yogurts made with the three component blend were most acceptable, those with the two component blend acceptable, and those with only one starch were unacceptable texturally. Further, yogurts made with the three component blend showed superior water holding functionality and had excellent textural stability over time.

Example 3

Preparation of a Light Sour Cream

| | AMOUNT (% w/w) | |
|---|---|---|
| INGREDIENTS | Experimental | Control |
| Whole Milk | 70.00 | 70.00 |
| Cream | 16.50 | 16.50 |
| Skim Milk | 4.72 | 7.12 |
| Non-Fat Dry Milk | 5.00 | 5.00 |
| Starch B | 1.20 | 0.00 |
| Starch A | 0.90 | 0.00 |
| Starch D | 0.90 | 0.00 |
| Emulsifier (DUR-EM 204)[1] | 0.40 | 0.40 |
| Guar Gum (Jaguar 4000FC)[2] | 0.00 | 0.35 |
| Salt | 0.30 | 0.30 |
| Locust Bean Gum (LBG 175)[2] | 0.00 | 0.25 |
| Sodium Citrate | 0.08 | 0.08 |

[1]mono- and di-glycerides commercially available from Loders Croklaan, USA
[2]commerically available from Rhodia, Inc.

The dry ingredients were blended thoroughly. The emulsifier and the blend were added to the milk and cream under high agitation. The mix was preheated to 150° F. and pasteurized at 200° F. for 30 seconds. The mix was next homogenized at 2000 psi, (1500 psi—1st stage; 500 psi—2nd stage), then cooled to between 72 and 78° F. The mix was inoculated with Rhodia, Inc. DPL 831 sour cream culture @ 0.024 g/l inoculation rate and mixed well. The inoculated mix was poured into cups and incubated at 76° F. until a pH range of 4.5–4.6 is obtained, refrigerating at 40° F.

The sour creams were evaluated. The experimental light sour cream made with the three component starch blend gave a significantly better texture than the control light sour cream formulation made with the gums. Although both formulations resulted in smooth, lubricious, full-fat like products, the starch-based formulation gave much more of a cuttable texture (leaving a sharp divot when cut into with a spoon), and also yielded a heavier-bodied product with more mouthcoating. In comparison, the gum-based product was less cuttable (leaving a divot with only rounded edges), and was much lower in body and mouthcoating.

Example 4

Preparation of a Light Sour Cream

| | AMOUNT (% w/w) | |
|---|---|---|
| INGREDIENTS | Experimental | Control |
| Whole Milk | 70.00 | 70.00 |
| Cream | 16.50 | 16.50 |
| Skim Milk | 7.12 | 10.12 |
| Non-Fat Dry Milk | 2.00 | 2.00 |
| Starch B | 1.20 | 0.00 |

-continued

| INGREDIENTS | AMOUNT (% w/w) | |
|---|---|---|
| | Experimental | Control |
| Starch A | 0.90 | 0.00 |
| Starch E | 0.90 | 0.00 |
| Emulsifier (DUR-EM 204)[1] | 0.40 | 0.40 |
| Guar Gum (Jaguar 4000FC)[2] | 0.35 | 0.35 |
| Salt | 0.30 | 0.30 |
| Locust Bean Gum (LBG 175)[2] | 0.25 | 0.25 |
| Sodium Citrate | 0.08 | 0.08 |
| Salt | 0.30 | 0.30 |

[1]mono- and di-glycerides commercially available from Loders Croklaan, USA
[2]commerically available from Rhodia, Inc.

The dry ingredients were blended thoroughly. The emulsifier and the blend were added to the milk and cream under high agitation. The mix was preheated to 150° F. and pasteurized at 200° F. for 30 seconds. The mix was next homogenized at 2000 psi, (1500 psi—1st stage; 500 psi 2nd stage), then cooled to between 72 and 78° F. The mix was inoculated with Rhodia, Inc. DPL 831 sour cream culture @ 0.024 g/l inoculation rate and mixed well. The inoculated mix was poured into cups and incubated at 76° F. until a pH range of 4.5–4.6 is obtained, refrigerating at 40° F.

The sour creams were evaluated. The light sour cream made with the three component starch blend yielded a significantly improved texture when compared to the light sour cream made without the starch. The starch-based product had a more shiny appearance and much more of a cuttable texture (yielding a divot with very sharp edges when the product was cut into with a spoon). The light sour cream made without the starch was somewhat dull in appearance and was less cuttable. The starch-based light sour cream also had a shorter texture and much heavier body when compared to the starch-less light sour cream. The product made with the starch was also more lubricious in mouth feel and had a heavier mouth coating than the product made without the starch.

Example 5

Preparation of Light Cream Cheese

| INGREDIENTS | AMOUNT (% w/w) | |
|---|---|---|
| | Experimental | Control |
| Whole Milk | 56.55 | 59.55 |
| Cream | 35.00 | 35.00 |
| Non-Fat Dry Milk | 3.30 | 3.30 |
| Starch B | 1.20 | 0.00 |
| Starch A | 0.90 | 0.00 |
| Starch E | 0.90 | 0.00 |
| Salt | 1.00 | 1.00 |
| Emulsifier (DUR-EM 204)[1] | 0.55 | 0.55 |
| Guar Gum (Jaguar 4000FC)[2] | 0.35 | 0.35 |
| Locust Bean Gum (LBG 175)[2] | 0.25 | 0.25 |

[1]mono- and di-glycerides commercially available from Loders Croklaan, USA
[2]commerically available from Rhodia, Inc.

The dry ingredients were blended thoroughly. The blend and the emulsifier were added to the milk and cream under high agitation. The mix was preheated to 150° F. and pasteurized at 200° F. for 30 seconds. The mix was next homogenized at 2000 psi, (1500 psi—1st stage; 500 psi— 2nd stage) and cooled to between 72 and 78° F. Then the mix was inoculated with Rhodia, Inc. DPL 201 cream cheese culture @ 0.024 g/l inoculation rate, mixed well, and poured into tubs. The tubs were incubated at 76° F. until a pH range of 4.6–4.7 is obtained, refrigerating at a temperature of 40° F.

The cream cheeses were evaluated. The experimental light cream cheese made with the three component starch blend yielded a significantly improved texture when compared to the control light cream cheese made without the starch. The starch-based product was significantly more firm, and also yielded a much more short, cuttable texture compared to the light cream cheese made without the starch. The presence of the starch also resulted in a heavier body and more full mouth coating (like that of a full-fat product), when compared to the starch-less product, which had a weaker body and was somewhat mouth drying.

Example 6

Preparation of Light Cream Cheese

| INGREDIENTS | AMOUNT (% w/w) | |
|---|---|---|
| | Experimental | Control |
| Whole Milk | 40.45 | 42.85 |
| Cream | 40.00 | 40.00 |
| Non-Fat Dry Milk | 15.00 | 15.00 |
| Starch B | 1.20 | 0.00 |
| Starch A | 0.90 | 0.00 |
| Starch D | 0.90 | 0.00 |
| Salt | 1.00 | 1.00 |
| Emulsifier (DUR-EM 204)[1] | 0.55 | 0.55 |
| Guar Gum (Jaguar 4000FC)[2] | 0.00 | 0.35 |
| Locust Bean Gum (LBG 175)[2] | 0.00 | 0.25 |

[1]mono- and di-glycerides commercially available from Loders Croklaan, USA
[2]commerically available from Rhodia, Inc.

The dry ingredients were blended thoroughly. The blend and the emulsifier were added to the milk and cream under high agitation. The mix was preheated to 150° F. and pasteurized at 200° F. for 30 seconds. The mix was next homogenized at 2000 psi, (1500 psi—1 st stage; 500 psi— 2nd stage) and cooled to between 72 and 78° F. Then the mix was inoculated with Rhodia, Inc. DPL 201 cream cheese culture @ 0.024 g/l inoculation rate, mixed well, and poured into tubs. The tubs were incubated at 76° F. until a pH range of 4.6–4.7 is obtained, refrigerating at a temperature of 40° F.

The cream cheeses were evaluated. The experimental light cream cheese made with the three component starch blend gave a superior texture when compared to the control light cream cheese (made with the gums). The starch-based product was significantly more firm and yielded a shorter, cuttable texture compared to the gum-based product, which was less firm longer and more cohesive in texture. The starch-based light cream cheese also resulted in a heavier mouthcoating (like that of a full-fat product), when compared to the gum-based product.

Example 7

Preparation of Vanilla Pudding

| | | AMOUNT (% w/w) | |
|---|---|---|---|
| INGREDIENTS | | Experimental | Control |
| A. | Partially Hydrogenated Soybean Oil | 4.00 | 4.00 |
| | Sodium Steroyl Lactylate | 0.15 | 0.15 |
| | Skim Milk | 40.00 | 46.00 |
| B. | Sucrose | 13.05 | 13.05 |
| | Starch I | 2.40 | 0.00 |
| | Starch A | 1.80 | 0.00 |
| | Starch E | 1.80 | 0.00 |
| | Artificial Vanilla Flavor (powder) | 0.15 | 0.15 |
| | Salt | 0.15 | 0.15 |
| C. | Eggshade Color (1% solution) | 0.10 | 0.10 |
| | Skim Milk | 36.40 | 36.40 |

From part A, the oil was heated to 125° F., then the sodium steroyl lactylate was added and mixed well. The skim milk was added and blended well. Under medium agitation, the slurry was heated to 140° F. and held for 10 minutes. The dry ingredients of part B were blended and added to the slurry of A under high agitation. The color and skim milk from part C were added to the slurry under medium agitation. The slurry was heated to 140° F. and homogenized at 2000 psi, (1500 psi—1st stage; 500 psi—2nd stage). The mixture was pasteurized at 250° F. for 30 seconds and cooled to 100° F. The mixture was poured into cups and refrigerated at 40° F.

The puddings were evaluated. The experimental vanilla pudding made with the three component starch blend yielded a significantly improved texture when compared to the control vanilla pudding made without the starch. The starch-based pudding had a nice medium body, very good cuttability, and a very good mouth feel and mouth coating. The pudding made without the starch was extremely runny—with no body and hardly any mouth feel.

Example 8

Preparation of Cheese Product

| | AMOUNT (% w/w) | |
|---|---|---|
| INGREDIENTS | Experimental | Control |
| Edamer[1] | 54.4 | 58.6 |
| Butter | 9.9 | 8.7 |
| Champiolact[2] 12/8 | 3.5 | 3.6 |
| SOLVA[3] 820 | 1.8 | 1.8 |
| Starch A | 0.4 | 0.0 |
| Starch B | 0.6 | 0.0 |
| Starch G | 0.4 | 0.0 |
| Water | 29.0 | 27.3 |

[1]Edamer hard cheese commercially available from multiple sources (55% dry matter; 40% fat in dry matter content according to the European standard of identity)
[2]Champiolact 12/8 whey powder commercially from Alpavit Käserei Champignon The cheese was cut into small pieces. All the ingredients were placed in a Stephan cutter and mixed for one minute at 3000 rpm. The mixture is heated to 85° C. with indirect steam at 2000 rpm, then creamed at 85° C. and 1500 rpm for one minute at a vacuum of 0.8 bars absolute. The mixture was placed in flat boxes and allowed to cool.

The cheeses were evaluated. The control was glossy, short textured, firm, and had no meltability in the mouth. The texture of experimental cheese 8a was substantially the same as that of the control: it was glossy, short textured, and firm.

We claim:

1. A composition comprising:
   (a) from about 20–80% of a high amylose gelling starch which is at least partially non-retrograded and at least partially non-crystalline;
   (b) from about 0–80% of a non-gelling crosslinked or thermally-inhibited starch; and
   (c) from about 0–80% of a non-gelling, stabilizing starch; and wherein either component (b) or (c) must be present in an amount of at least about 20%.

2. The composition of claim 1, wherein component (a) is substantially non-retrograded, non-crystalline; component (b) is a crosslinked starch; and component (c) is a stabilized starch.

3. The composition of claim 2, wherein components (a) and (c) are further at least partially converted and component (b) is further stabilized starch.

4. The composition of claim 1, wherein component (a) is a substantially non-retrograded, substantially non-crystalline partially converted high amylose starch, component (b) is a crosslinked, stabilized, waxy starch, and component (c) is a partially converted stabilized starch.

5. The composition of claim 1, wherein component (c) is present in an amount of from about 20–80%.

6. The composition of claim 1, wherein component (a) is substantially non-retrograded, substantially non-crystalline.

7. A food product comprising from about 0.1 to 7.5% of the composition of claim 1.

8. A food product comprising from about 0.1 to 7.5% of the composition of claim 4.

9. The food product of claim 7, wherein the food is a cultured dairy product and the composition is present in an amount of from about 1.0 to 4.5%.

10. The food product of claim 8, wherein the food is a cultured dairy product and the composition is present in an amount of from about 1.0 to 4.5%.

11. A method of replacing at least a portion of the gelatin, gum, and/or non-fat milk solids in a food product comprising adding the composition of claim 1.

12. A method of replacing at least a portion of the gelatin, gum, and/or non-fat milk solids in a food product comprising adding the composition of claim 4.

13. A method of gelling, viscosifying and/or stabilizing a food product comprising adding the composition of claim 1.

14. A method of gelling, viscosifying and/or stabilizing a food product comprising adding the composition of claim 4.

15. The composition of claim 1, wherein the composition at 10% solids has a G' greater than about 1000 Pascals at one radian/second and 10° C., a critical strain greater than about 20% at 10° C., and which exhibits water loss <1.5% when subjected to a relative centrifugal force of 10,000 g.

16. The composition of claim 4, wherein the composition at 10% solids has a G' greater than about 1000 Pascals at one radian/second and 10° C., a critical strain greater than about 20% at 10° C., and which exhibits water loss <1.5% when subjected to a relative centrifugal force of 10,000 g.

17. The method of claim 13 wherein the product is a dairy product.

18. The method of claim 14 wherein the product is a dairy product.

* * * * *